United States Patent
Kristani

(10) Patent No.: US 11,092,072 B2
(45) Date of Patent: Aug. 17, 2021

(54) THROTTLE REPLACING DEVICE

(71) Applicant: Filip Kristani, Maywood, NJ (US)

(72) Inventor: Filip Kristani, Maywood, NJ (US)

( * ) Notice: Subject to any disclaimer, the term of this patent is extended or adjusted under 35 U.S.C. 154(b) by 57 days.

(21) Appl. No.: 16/589,772

(22) Filed: Oct. 1, 2019

(65) Prior Publication Data
US 2021/0095593 A1  Apr. 1, 2021

(51) Int. Cl.
| F02B 33/22 | (2006.01) |
| F02B 77/14 | (2006.01) |
| F02B 37/16 | (2006.01) |
| F02B 33/44 | (2006.01) |
| F02D 41/00 | (2006.01) |

(52) U.S. Cl.
CPC ............ *F02B 77/14* (2013.01); *F02B 33/446* (2013.01); *F02B 37/162* (2019.05); *F02D 41/0007* (2013.01)

(58) Field of Classification Search
CPC ........... F02D 41/0007; F02D 2041/001; F02D 13/0261; F02D 41/0077; F02D 41/0002; F02D 13/0249; F02D 41/008; F02D 13/0203; F02D 13/0234; F02D 2009/0279; F02B 77/14; F02B 37/162; F02B 33/446; F02B 25/145; F02B 37/00; F02B 33/22; F02B 67/10; F02B 29/08; F02B 75/18
USPC ....................................................... 123/70 R
See application file for complete search history.

(56) References Cited

U.S. PATENT DOCUMENTS

| 1,248,250 A * | 11/1917 | Bohler ................. F02B 75/228 123/197.4 |
| 1,392,359 A * | 10/1921 | Rudqvist ................ F02B 25/00 123/51 B |
| 1,856,048 A * | 4/1932 | Ahrens ................. F02B 75/228 123/68 |
| 1,904,775 A * | 4/1933 | Bartholomew ......... F02B 41/06 60/620 |
| 3,863,613 A * | 2/1975 | Petrie ...................... F02B 33/22 123/26 |
| 5,499,605 A * | 3/1996 | Thring .................... F02B 41/06 123/298 |
| 6,340,004 B1 * | 1/2002 | Patton ..................... F02B 33/22 123/250 |
| 6,899,061 B1 * | 5/2005 | Loth ....................... F02B 11/00 123/27 R |
| 7,201,156 B1 * | 4/2007 | Wait .......................... F01L 1/28 123/556 |
| 8,028,665 B2 * | 10/2011 | Ralston ................... F02B 41/06 123/68 |

(Continued)

FOREIGN PATENT DOCUMENTS

JP             52041713 A  *  3/1977

*Primary Examiner* — George C Jin
*Assistant Examiner* — Teuta B Holbrook
(74) *Attorney, Agent, or Firm* — Thomas J. Germinario

(57) ABSTRACT

A compressor like unit which can be attached to an internal combustion engine controls the amount of the air mass that passes through its cylinder to the internal combustion engine based on the engine load condition requirement at a given time replacing this way the throttle device function and creating thus a throttle-less internal combustion engine. The compressor can be built in different ways and can function as one or multiple units attached directly to the engine through its crankshaft or a gear box or by other means.

4 Claims, 6 Drawing Sheets

(56) References Cited

U.S. PATENT DOCUMENTS

| | | | | |
|---|---|---|---|---|
| 8,646,421 B2* | 2/2014 | Durrett | ............... | F02B 41/06 |
| | | | | 123/70 R |
| 2006/0137631 A1* | 6/2006 | Patton | ................. | F02B 33/22 |
| | | | | 123/70 R |
| 2008/0184969 A1* | 8/2008 | Schroeder | ............ | F02M 59/34 |
| | | | | 123/505 |
| 2010/0095927 A1* | 4/2010 | Salminen | ............. | F02B 33/06 |
| | | | | 123/254 |
| 2010/0263646 A1* | 10/2010 | Giannini | ............. | F02B 33/22 |
| | | | | 123/70 R |
| 2012/0090580 A1* | 4/2012 | Hu | ..................... | F02D 13/028 |
| | | | | 123/564 |
| 2013/0298869 A1* | 11/2013 | Hirzinger | ........... | F02D 41/0027 |
| | | | | 123/395 |
| 2014/0261325 A1* | 9/2014 | Scuderi | ............... | F02B 41/06 |
| | | | | 123/445 |

\* cited by examiner

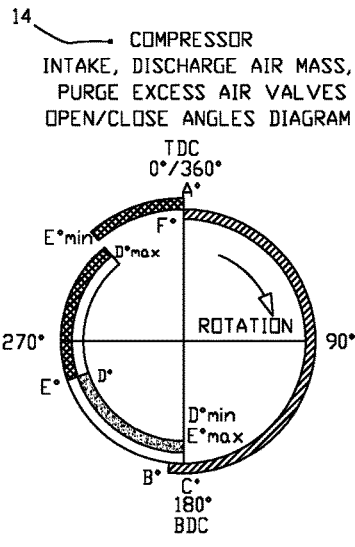
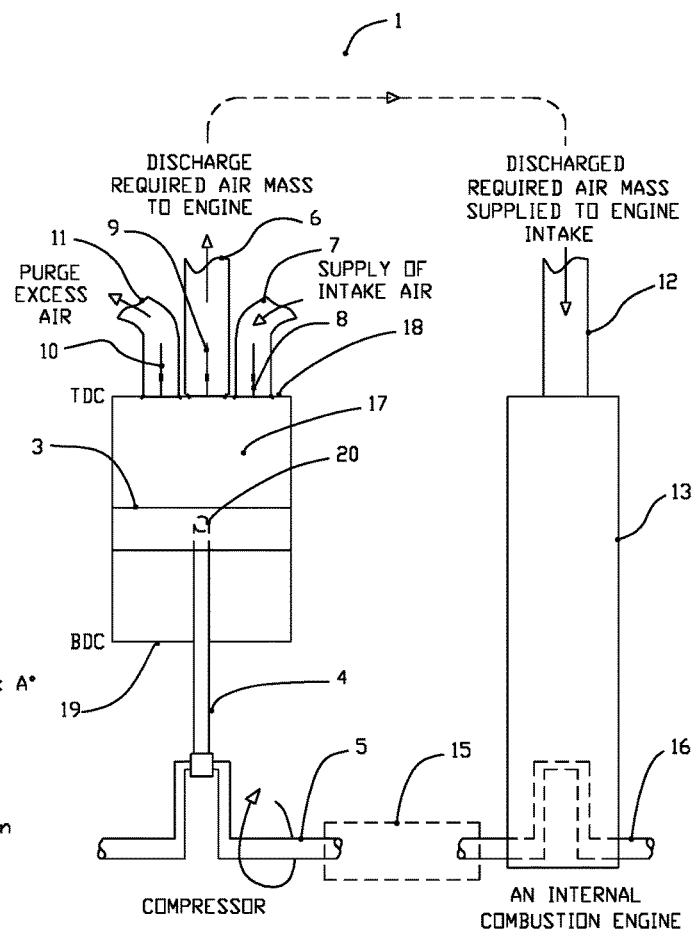
Fig.1a
Fig.1b

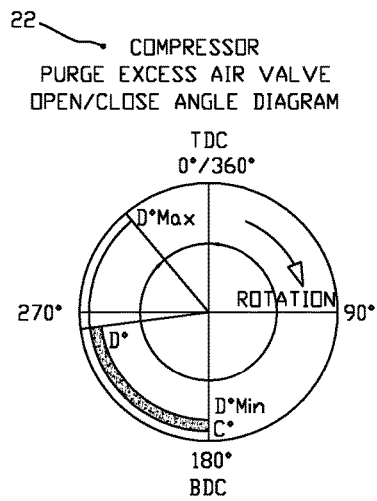
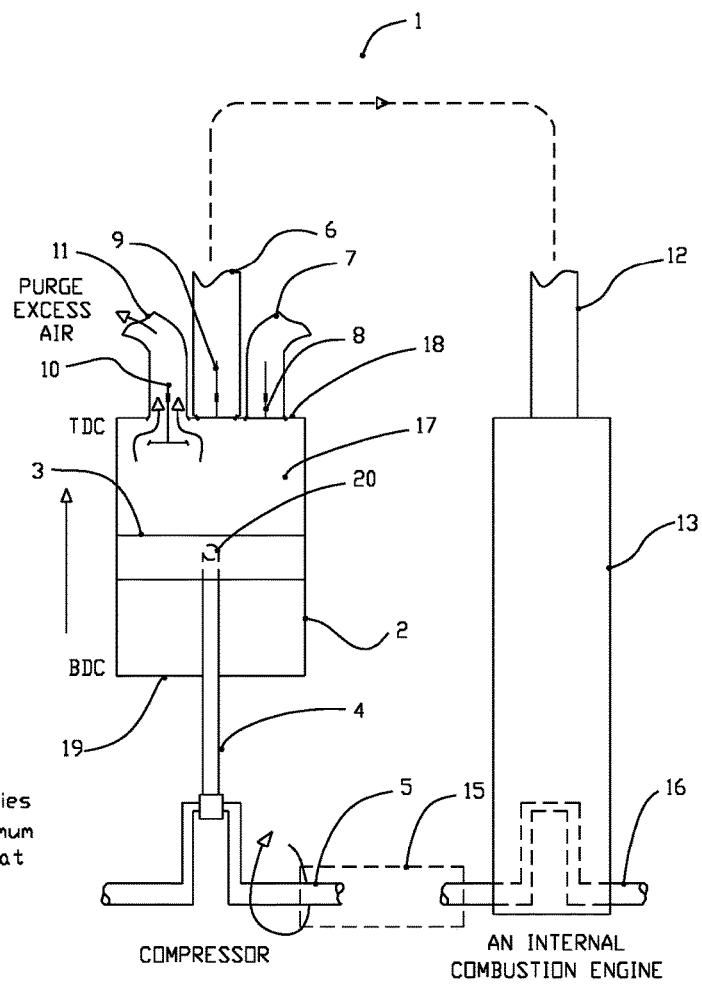
Fig.3a
Fig.3b

Purge excess air valve(s) 10 open at C°<180°
closing D° varies. Between C° and D°Max.
C°-D° interval depends on D°, from C°- D°Max.
C°-D° interval C°-D°=D°Min, maximum power.
C°-D° interval C°-D°=D°Max, minimum power.

14 — COMPRESSOR
DISCHARGE AIR MASS VALVE
OPEN/CLOSE ANGLE DIAGRAM

Discharge air valve(S) 9 open at(E°)- close
at approx (TDC/F°), open of E° varies.
E°-F° interval length varies from approx:
E°=E°Min-F° to E°=E°Max-F°. E°Max<,=,>180°.
E°-F° interval E°=E°Max-F°, maximum power.
E°-F° interval E°=E°Min-F°, minimum power.

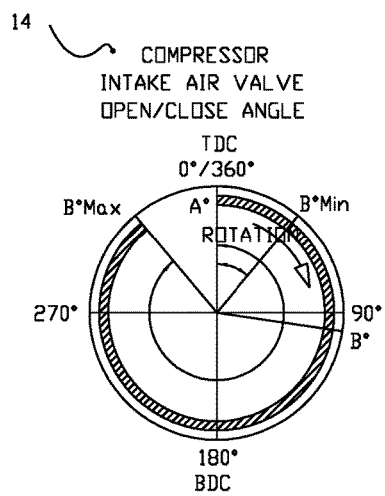
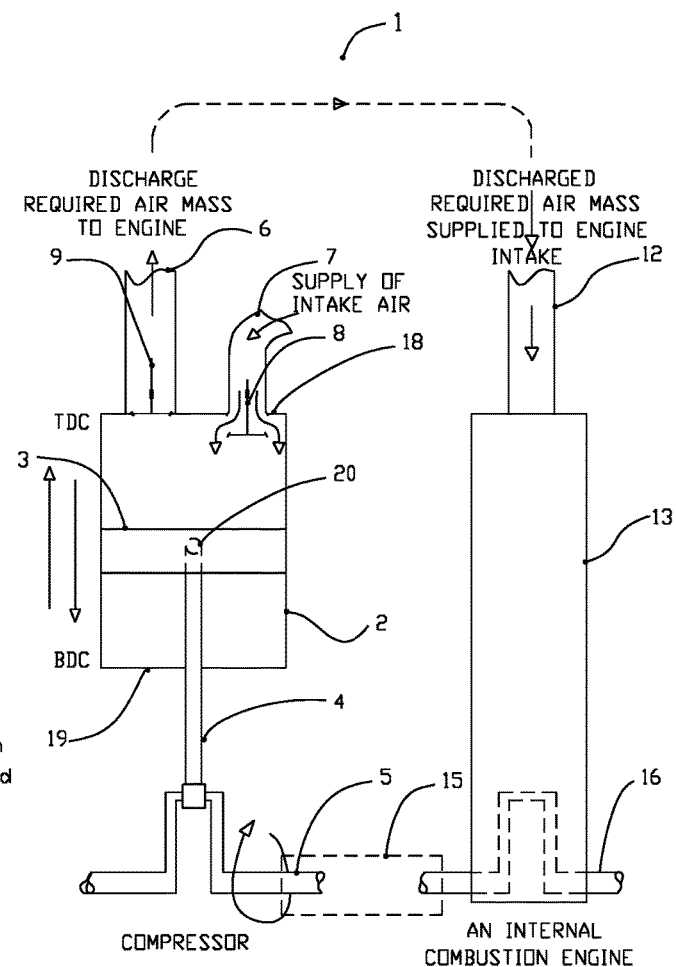
Fig.6a
Air intake valve(s) open at approx between A° to BDC- close at B° in between B°Min and apprx B°Max.
B°Min-B°Max intake closing interval < 360°.
Fig.6b

THROTTLE REPLACING DEVICE

REFERENCE TO RELATED APPLICATIONS

This application is a new application.

FIELD OF INVENTION

The present invention relates to the field of internal combustion engines.

BACKGROUND OF THE INVENTION

The efficiency of an internal combustion engine is mostly limited due to the thermal energy loss during operation. Its efficiency is further reduced by the use of a particular device such as throttle device in conditions like partial engine load operation. A throttle, as it is known, restricts the amount of the air in an internal combustion engine based on the engine load requirement. A throttle device can further lower the efficiency of an internal combustion engine because of the pumping and thermal loss caused by its use and which use can produces losses in range of about 0% to 14% or more. Being that most of the time the engines operate under such partial load conditions, the throttle energy loses of 8% to 14% are almost always present. The lower the load the higher pumping loss.

SUMMARY OF THE INVENTION

The present invention proposes a device that can replace the throttle function and therefore its energy loses in an internal combustion engine. The device proposed is a certain unique compressor unit, see FIG. 1, which can be added to the internal combustion engines.

The compressor unit can be built to operate in different ways and it can be built as a single compressor unit or multiple compressor units. The compressor(s) would function as such that its operation would control the amount of the air mass that passes through its cylinder(s) to the internal combustion engine replacing this way the throttle device functionality.

One of the ways the compressor can control the amount of the air mass is shown in FIG. 1 which shows a compressor unit that controls the amount of the air mass by expelling some of the inducted air again and which process is achieved by operating the intake, discharge and purge excess air valves in a particular way.

The other way is the compressor shown in FIG. 6 which shows a compressor that restricts the amount of the air mass in the compressor during its intake process by operating the intake and discharge valves in a different way. There could be other ways that the air amount is controlled by the compressor for the purpose described herein.

The valves of the compressor can be operated electronically, mechanically, pneumatically, pressure difference or by any other means. For illustration purposes only a single unit compressor is shown in FIG. 1, FIG. 2, FIG. 3, FIG. 4, FIG. 4 and in FIG. 6.

DETAILED DESCRIPTIONS OF THE PREFERRED EMBODIMENTS

As it is shown in FIG. 1 (FIG. 1a and FIG. 1b) the compressor that will replace the throttle is attached to an internal combustion engine 13 and comprises:

a cylinder 2, a piston 3 with a pin (not shown) and a connecting rod 4, a crankshaft 5 that can be connected directly or through a gear box (not shown) to the engine crankshaft 5, a top cover, an intake pipe or manifold 7, a purge excess air pipe or manifold 11, a discharge air mass pipe or manifold 6 and three particular valves. The valves that operate the compressor are: The "Intake Air" valve 8, the "Purge Air Excess" valve 10 and the "Discharge Air Mass" valve 9. Each of the valve types can be singular in number or plural. These three types of valves in the compressor function in a certain way as described below.

The "Intake Air" valve 8 opens when the piston 3 is at approximate around A° or at TDC (Top Dead Center) of crankshaft angular rotation position, see FIG. 2 (FIG. 2a and FIG. 2b), as the piston prepares to move downward toward Bottom Dead Center (BDC, 180°) and closes at approximate BDC or near past BDC as needed to allow maximum suction, at or around approximate 190° (B°), which can vary depending on the compressor design, of the compressor crankshaft 5 rotation angle and the entire possible air mass that engine can use when producing full power is collected in the intake or suction process. At this point the "Intake Air" valve 8 will close as it normally could in a compressor and the engine load operation will determine the amount of air mass trapped inside the compressor cylinder that is required by the engine at that moment and therefore determine the operation of the remaining two other valves such as the "Purge Air Excess" valve 10 and The "Discharge Air Mass" valve 9. If the engine is required to operate under partial load operation and only a part of the entire inducted air mass is required to operate the engine, the "Purge Air Excess" valve 10, see FIG. 3 (FIG. 3a and FIG. 3b), will open which process happens at or around approximate 180° (C°) or around BDC of compressor crankshaft 5 rotation angle while the "Intake Air" valve 8 is about to close as mentioned above at or about B°, see FIG. 2 (FIG. 2a), just about past BDC while "Discharge Air Mass" valve 9 remains closed, See FIG. 5 (FIG. 5a). Since the "Discharge Air Mass" valve 9 is closed at that point and the "Intake Air" valve 8 is about or would close immediately after, the air will be expelled through "Purge Excess Air" valve 10, see FIG. 3b and FIG. 3a, while piston moves upward from BDC to TDC for as long as the "Purge Air Excess" valve 10 remains open. The expelled air through "Purge Air Excess" valve 10 can be discharged into the atmosphere or returned back to the engine air filter housing (not shown) for consecutive compressor intake (suction) process. As it is shown in operating valve angle diagram 14 of FIG. 3 (FIG. 3a and FIG. 3b), the "Purge Air Excess" valve 10 is operated (opened) between C° or approximate BDC of compressor crankshaft 5 angle rotation when the valve is opened as mentioned above, and it is closed at D° which position falls in between C°/D°$_{Min}$, approx. BDC or around 180° and D°$_{Max}$ (which itself falls in approx. more than 270° and less than TDC/360°) of compressor crankshaft 5 angle rotation as the piston moves upward. If the "Purge Air Excess" valve 10 is closed immediately after opening at D°=C°/D°$_{Min}$ which means that no air could be expelled, the engine would be operating at maximum power. If the "Purge Air Excess" valve 10 closes at D°=D° Max (approx. in between at more than 270° and less than 360°) that means the engine will operate at minimal power because most of the air inducted during intake process will be expelled again through purge excess air manifold 11 and only some air remains in the compressor cylinder for the engine to consume.

In an alternative design the "Purge Air Excess" valve 10 is operated (opened) at C° that is not approximate operated at BDC but when C° is much less than 180° and falls in between TDC or around 0° and 180°, see FIG. 4(FIG. 4a), and closed as described herein above.

The last valve, the "Discharge Air Mass" valve 9, see FIG. 5 (FIG. 5a and FIG. 5b) operation follows the operation of the "Purge Air Excess" valve 10, see FIG. 3 (FIG. 3a, FIG. 3b) and FIG. 5 (FIG. 5a, FIG. 5b). The "Discharge Air Mass" valve 9 will open as soon as the "Purge Air Excess" valve 10 is closed and will close at or approximate 360°/0° (F° or TDC) to allow for the remaining air mass in the compressor cylinder to pass through its discharge air mass manifold 6 to the internal combustion engine 13 through its intake pipe or manifold 12 for combustion process. This means that "Discharge Air Mass" valve 9 is operated when it is opened at E° which opening falls in between approximate near BDC or approx. 180° ($E_{Max}$°) and ($E_{Min}$°) following the closing of the "Purge Air Excess" valve 10 at approximate same point D° (D° ~E°) and it is closed at 360°/0° (F° or TDC) of crankshaft rotation angle as piston is at TDC, see FIG. 5 (FIG. 5a).

As explained above the opening of the "Discharge Air Mass" valve 9 at E°=$E_{Max}$° (approx. 180°) or around BDC follows the closing of the "Purge Air Excess" valve 10 at approximate the same time and position and corresponds to the maximum engine power in this case since no air will be expelled to atmosphere or returned back to air filter housing through "Purge Air Excess" valve 10 and the entire inducted air mass will pass through "Discharge Air Mass" valve 9 and the discharge air manifold 6 through engine's intake pipe or manifold 12 to the engine 13.

The opening of the "Discharge Air Mass" valve 9 at E°=$E_{Min}$° (apprx in between 270° and 360°) or around it follows the closing of the "Purge Air Excess" valve 10 at approximate the same time and position and corresponds to the minimum engine power (or engine idling) since most of the air has been expelled to atmosphere or returned to air filter housing through "Purge Air Excess" valve 10.

Any other case of compressor operation that involves closing the "Purge Air Excess" valve 10 and opening the "Discharge Air Mass" valve 9 in between and more than from BDC/180° and approximate equal or less than F° of compressor crankshaft rotation angle corresponds to a partial load engine operation.

Note that rotation angle values of $E_{Min}$°, $E_{Max}$®, $D_{Min}$° and $D_{Max}$° of valve operation will depend on engine design characteristics, engine idle power requirement and other factors.

FIG. 6 (FIG. 6a, FIG. 6b) shows a different type built compressor that can replace the throttle device. The operating valve diagram 14 shows the compressor's "Intake Air" valve 8 opens at approximate A° (0°) or TDC and closes at B° which positions falls in between approximate $B_{Min}$° (approx. BDC>0° and BDC) and $B_{Max}$° (approx more than 270° but less than or equal than 360° or TDC), restricting the amount of air in the compressor this way. The "Discharge Air Mass" valve 9 operation and specifically its opening with respect to the compressor crankshaft rotation angle is a function of compressor intake air pressure (that could be atmospheric air pressure or not), the air pressure inside the compressor cylinder, the air pressure in the discharge air manifold 6 which pressure in condition of engine partial load operation could be less than atmospheric pressure and the control method of the valve, but it would close at approximate 360° or TDC.

The opening and closing of the compressor valve angles are approximate and can vary based on the engine design and requirement.

BRIEF DESCRIPTION OF THE DRAWINGS

FIG. 1 which includes FIG. 1a and FIG. 1b is a diagram illustrating the compressor unit that replaces the throttle device in an internal combustion engine. It shows the major elements of the compressor including its three valves. The compressor can be connected to the internal combustion engine through its crankshaft directly attached to the engine crankshaft or through a gear box. FIG. 1a shows also the portions of crankshaft rotation angle of the compressor's all three valves operation.

FIG. 2 which includes

FIG. 3 (FIG. 3a and FIG. 3b) shows the operation of the "Purge Air Excess" valve 10 only which is opened at approximate 180° and closed in between 180° and 320° depending on engine load.

FIG. 6 (FIG. 6a and FIG. 6b) shows a compressor unit which operation controls the amount of the air mass by manipulating the operation of the "Intake Air" valve 8 which opens at 0° and closes it in between 40° and 320° of crankshaft rotation angle.

Figure 2A:
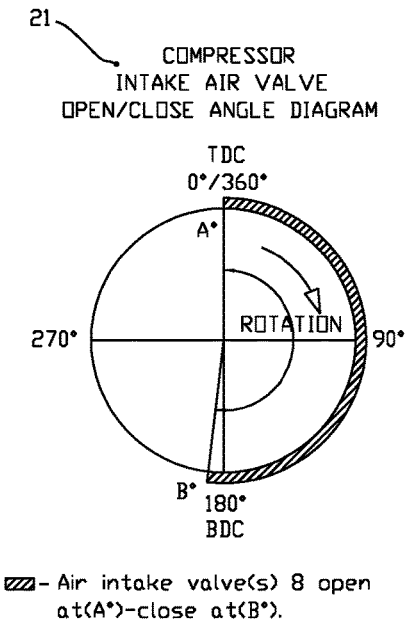
FIG. 2a and FIG. 2b, shows the operation of the "Intake Air" valve 8 only. So the "Intake Air" valve 8 is operated by opening at approximate 0° and closing at approximate past 180° to around 190° or more depending on the compressor design and on the air mass temperature and its inertia.
Figure 2B:
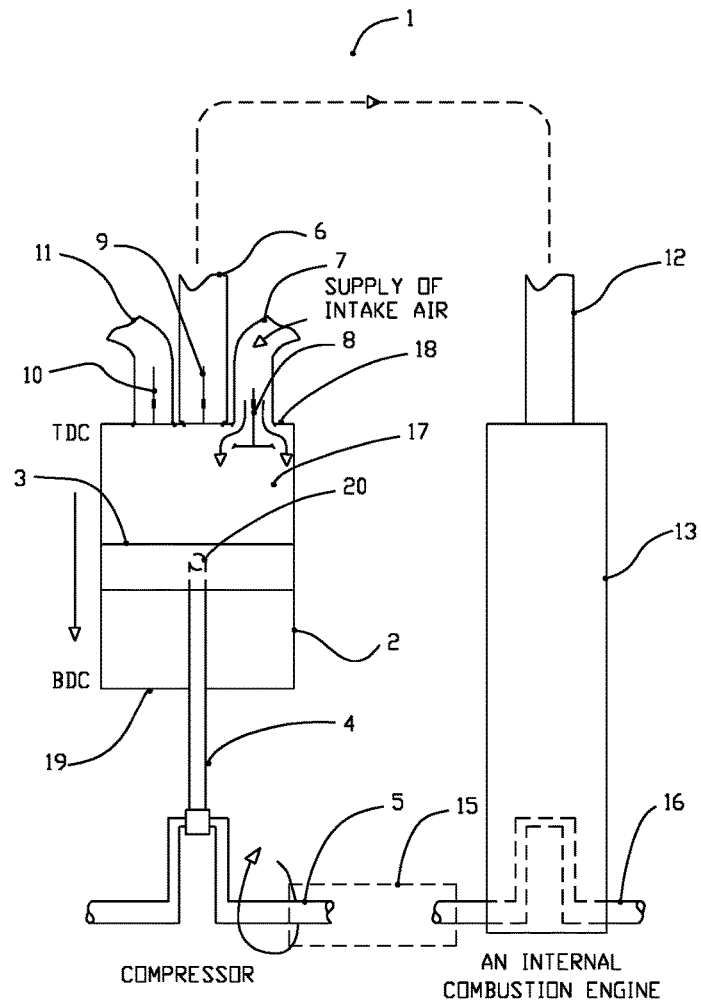
Figure 4A:
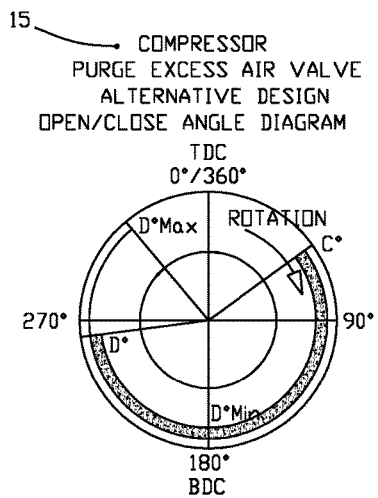
FIG. 4 (FIG. 4a and FIG. 4b) shows an alternative case of the "Purge Air Excess" valve 10 which can open much earlier than 180° and close still in between 180° and 320° depending on engine load.
Figure 4B:
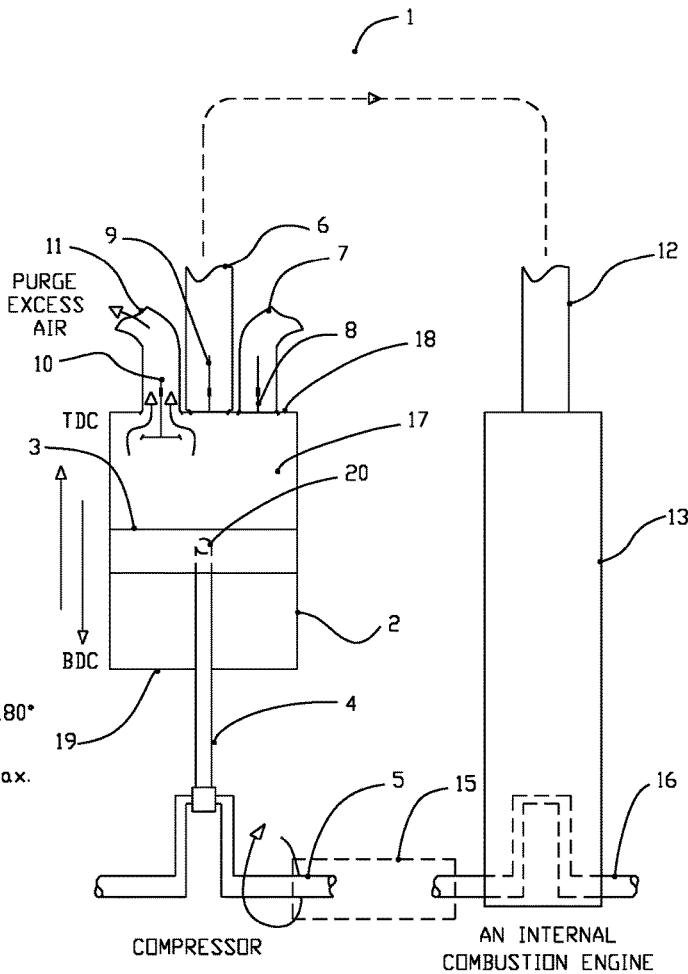
Figure 5A:
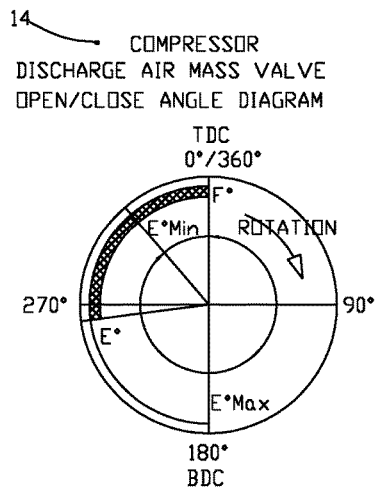
FIG. 5 (FIG. 5a and FIG. 5b) shows the operation of the "Discharge Air Mass" valve 9 only which is opened in between 180° and 320° and it is closed at approximate 360° depending on engine load.
Figure 5B:
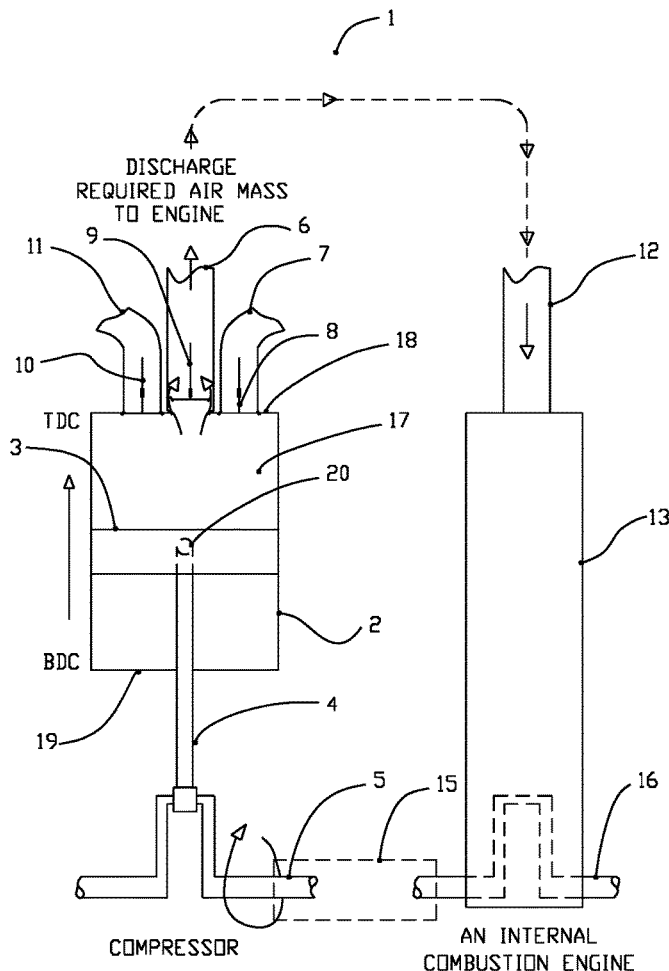

Although the preferred embodiments of the present invention have been disclosed for illustrative purposes, those skilled in the art will appreciate that many additions, modifications and substitutions are possible, without departing from the scope and spirit of the present invention as defined by the accompanying claims.

As used hereinabove and in the following claims, the term Top Dead Center (TDC) means the piston's closest position to the cylinder head, and the term Bottom Dead Center (BDC) means the piston's farthest position from the cylinder head.

What is claimed is:

1. A compressor type device that controls an amount of an inducted air mass in the internal combustion engine based on an engine load requirement, thereby replacing a throttle device function in the internal combustion engine, wherein the compressor device comprising:

one or more compressor cylinders 2, wherein each cylinder has a cylinder volume 17, a top cover 18 and a top dead center (TDC), a bottom hole 19 and a bottom dead center (BDC), and wherein each cylinder contains an axially reciprocating piston 3 mechanically connected to a crankshaft 5 through a connecting rod 4 with a pin 20, and wherein each compressor cylinder is connected to the internal combustion engine directly or through a gear box 15 to an engine crankshaft 16, and wherein each compressor cylinder executes an intake process during which the piston moves axially from the TDC of angular crankshaft rotation position toward the BDC of angular crankshaft rotation position of the compressor cylinder and draws the amount of the inducted air mass required by the internal combustion engine to produce a maximal power proportionally, and wherein the intake process is followed by a purge process during which the piston moves upwards from the BDC towards the TDC, so that an excess of the inducted air mass is purged or expelled from the compressor cylinder as the piston moves axially toward the TDC, and wherein the purge process is followed by a discharge process as the piston approaches the TDC, during which discharge process a remainder of the inducted air mass in the compressor cylinder is sent to the internal combustion engine based on the engine load requirement at that moment.

2. A compressor type device according to claim 1, further comprising one or more intake air valve(s), one or more purge air valve(s), and one or more discharge air valve(s), wherein the intake air valve(s) 8 control the intake process, and the purge air valve(s) 10 control the purge process, and the discharge air valve(s) 9 control the discharge process.

3. A compressor type device of claim 1, further comprising one or more intake air valve(s) 8 and one or more discharge valve(s) 9, wherein the intake air valve(s) 8 control the intake process and the discharge air valve(s) 9 control the discharge process.

4. A compressor type device unit of claim 1 that controls the amount of an air mass in its compressor cylinder(s) 2 during its intake process for the purpose of replacing throttle function in an internal combustion engine.

* * * * *